(12) United States Patent
Hon

(10) Patent No.: US 11,851,113 B2
(45) Date of Patent: Dec. 26, 2023

(54) SELF-STABILIZING VEHICLE AND CONTROL METHOD THEREOF

(71) Applicant: DAHON TECH (SHENZHEN) CO., LTD., Shenzhen (CN)

(72) Inventor: David Tak Wei Hon, Shenzhen (CN)

(73) Assignee: DAHON TECH (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 18/079,028

(22) Filed: Dec. 12, 2022

(65) Prior Publication Data

US 2023/0116366 A1 Apr. 13, 2023

Related U.S. Application Data

(63) Continuation of application No. 16/484,118, filed as application No. PCT/CN2017/112042 on Nov. 21, 2017, now Pat. No. 11,554,818.

(30) Foreign Application Priority Data

Feb. 7, 2017 (CN) .......................... 201710068262.5

(51) Int. Cl.
  *B60G 17/016* (2006.01)
  *B62D 37/06* (2006.01)
  (Continued)

(52) U.S. Cl.
  CPC .............. *B62D 37/06* (2013.01); *B60G 11/00* (2013.01); *B60G 13/10* (2013.01);
  (Continued)

(58) Field of Classification Search
  CPC .. B60G 2202/242; B60G 11/00; B60G 13/10; B60G 17/0161; B62D 37/06
  See application file for complete search history.

(56) References Cited

U.S. PATENT DOCUMENTS 3,326,318 A * 6/1967 De Bevoise ........... B62D 37/06
  180/2.2
3,711,113 A * 1/1973 Stammreich ............. B62D 9/02
  280/5.521
(Continued)

FOREIGN PATENT DOCUMENTS

FR   2872773 A1 * 1/2006
GB   2598760 A  *  3/2022
(Continued)

OTHER PUBLICATIONS

FR 2872773 A1 machine translation from espacenet.com (Year: 2021).*
JP 2014069672 A machine translation (Year: 2021).*

*Primary Examiner* — Paul N Dickson
*Assistant Examiner* — Maxwell L Meshaka
(74) *Attorney, Agent, or Firm* — Bayramoglu Law Offices LLC

(57) ABSTRACT

A self-stabilizing vehicle includes a mass gyroscope which is fixed at an occupant compartment chassis corresponding to a portion where occupants sit. The occupant compartment portion may tilt outwards in response to the centrifugal force. If the vehicle has three or more wheels, the load is evenly distributed on the left wheel and the right wheel which move oppositely up and down about an effectively centrally-mounted shaft pin. Further, the present disclosure proposes a method for operating the self-stabilizing vehicle. According to the self-stabilizing vehicle and the operating method thereof, a vehicle having a narrow body may be used. When the vehicle undergoes external forces such as the centrifugal force and the crosswind, the occupant compartment can maintain the vertical stability even though the wheels may slide sideways.

4 Claims, 7 Drawing Sheets

(51) Int. Cl.
   *B62K 11/00*   (2006.01)
   *B60G 11/00*   (2006.01)
   *B60G 13/10*   (2006.01)

(52) U.S. Cl.
   CPC ........ *B60G 17/0161* (2013.01); *B62K 11/007* (2016.11); *B60G 2202/242* (2013.01); *B60G 2400/0511* (2013.01); *B60G 2400/204* (2013.01)

(56) References Cited

U.S. PATENT DOCUMENTS

| | | | | |
|---|---|---|---|---|
| 3,806,141 | A * | 4/1974 | Janer | B62D 49/08 280/6.154 |
| 6,328,125 | B1 * | 12/2001 | Van Den Brink | B62K 5/10 180/211 |
| 6,805,362 | B1 * | 10/2004 | Melcher | B60G 17/0165 280/86.757 |
| 8,249,775 | B2 * | 8/2012 | Van Den Brink | B62D 9/02 280/5.509 |
| 8,800,975 | B2 * | 8/2014 | Moulik | B60G 15/14 267/64.24 |
| 8,919,788 | B2 * | 12/2014 | Kim | B60G 17/0162 280/5.506 |
| 9,120,511 | B1 * | 9/2015 | Beard | B60L 15/20 |
| 9,248,716 | B2 * | 2/2016 | Moulik | F16F 9/0472 |
| 9,387,742 | B2 * | 7/2016 | Van Raaphorst | B60G 17/0161 |
| 9,744,824 | B2 * | 8/2017 | Fulton | B60G 17/08 |
| 9,776,678 | B2 * | 10/2017 | Zhu | B62D 61/02 |
| 9,919,574 | B2 * | 3/2018 | Füssl | B60G 21/0556 |
| 10,035,400 | B2 * | 7/2018 | Marble | B60G 17/02 |
| 10,486,755 | B2 * | 11/2019 | Wiley | B62D 37/06 |
| 10,501,119 | B2 * | 12/2019 | Doerksen | B60G 17/0162 |
| 10,513,291 | B2 * | 12/2019 | Kato | B60G 7/001 |
| 10,639,953 | B2 * | 5/2020 | Kimura | B60G 21/007 |
| 11,072,220 | B2 * | 7/2021 | Conti | B60G 17/08 |
| 11,072,389 | B2 * | 7/2021 | Doerksen | B62J 43/16 |
| 2011/0068552 | A1 * | 3/2011 | Ryan | B60G 21/073 29/428 |
| 2011/0115140 | A1 * | 5/2011 | Moulik | B60G 17/00 267/64.23 |
| 2013/0297152 | A1 * | 11/2013 | Hayashi | B62K 5/10 701/42 |
| 2014/0054867 | A1 * | 2/2014 | Kim | B60G 17/01908 280/5.509 |
| 2014/0124286 | A1 * | 5/2014 | Hayashi | B62K 5/10 180/400 |
| 2014/0346749 | A1 * | 11/2014 | Moulik | F16F 9/05 280/124.16 |
| 2015/0197133 | A1 * | 7/2015 | VanRaaphorst | B60G 17/0161 280/6.159 |
| 2015/0246292 | A1 * | 9/2015 | Beard | A63H 17/36 74/5.37 |
| 2016/0280033 | A1 * | 9/2016 | Fulton | B60G 15/12 |
| 2017/0043831 | A1 * | 2/2017 | Zhu | B62H 7/00 |
| 2017/0363429 | A1 * | 12/2017 | Zhu | B62H 1/12 |
| 2018/0029433 | A1 * | 2/2018 | Marble | B60G 17/02 |
| 2019/0161132 | A1 * | 5/2019 | Wiley | B62D 37/06 |
| 2019/0351727 | A1 * | 11/2019 | Zawacki | B60G 15/12 |
| 2019/0389518 | A1 * | 12/2019 | Youn | B62D 37/06 |
| 2020/0102043 | A1 * | 4/2020 | Zhang | B62J 45/415 |
| 2020/0156717 | A1 * | 5/2020 | Brendelson | B62D 37/06 |
| 2020/0262263 | A1 * | 8/2020 | Doerksen | B60G 3/01 |
| 2020/0324610 | A1 * | 10/2020 | Conti | B60G 17/08 |
| 2022/0177058 | A1 * | 6/2022 | Bryant | B62K 11/04 |

FOREIGN PATENT DOCUMENTS

| | | | |
|---|---|---|---|
| JP | 2010083447 | A * | 4/2010 |
| JP | 2014069672 | A * | 4/2014 |
| WO | WO-2015048823 | A1 * | 4/2015 |
| WO | WO-2017048065 | A1 * | 3/2017 |

* cited by examiner

SELF-STABILIZING VEHICLE AND CONTROL METHOD THEREOF

CROSS REFERENCE TO RELATED APPLICATIONS

This application is a continuation application of U.S. application Ser. No. 16/484,118, which is the national phase entry of international Application PCT/CN2017/112042, filed on Nov. 21, 2017 and based upon and claims priority to Chinese Patent Application No. 201710068262.5, filed on Feb. 7, 2017, the entire contents of which are incorporated herein by reference.

TECHNICAL FIELD

The present disclosure relates to a vehicle with two or more wheels, in particular to a self-stabilizing propelled multi-wheeled vehicle, which is especially suitable for a high-speed vehicle with a narrow body.

BACKGROUND

In the early 20th century, Ford Motor Company had attempted to promote a gyroscopic stabilized two-wheeled vehicle which had a wide body and was propelled by an internal combustion engine (the vehicle was not put into production after its roll-out). In recent years, some people have proposed the concept of gyroscopic stabilized two-wheeled electric motorcycle (which has not been put into production yet). Both of gyrocar and the gyroscopic motorcycle have two wheels (one wheel is at the front and the other at the rear), and are designed to be stabilized against a range of transverse external forces including a centrifugal force, a gravitational force, a wind force, and other external forces caused by the movements of loaded goods etc., based on physical laws involved by using a mass gyroscope to achieve ideal effects of stable movement and resisting toppling over (the mass gyroscope refers to a spinning top in the traditional physics, differing from the electronic gyroscopes in modern optics or electronics, the latter cannot offer a stable force, but can measure the orientation of an object more precisely.) Over a decade, at least twenty proposals and models for the multi-wheeled vehicle with the narrow body have emerged on the internet. However, there is yet no patent or literature disclosing a technical solution identical to the present disclosure.

It is well known that each wheel of a vehicle in contact with the ground can contribute to the road holding performance. The existence of road holding property is advantageous in making a turn, braking and generic stability. Therefore, 'multi-wheeled vehicles' are more stable and safer than two-wheeled vehicles, especially when travelling at a high speed. Especially, besides the gyroscope, if an auxiliary smart electromagnetic actuating system can be additionally provided, a better use effect can be achieved, and its overall performance dwarfs the two-wheeled vehicles. Moreover, the electromagnetic system can even work independently to stabilize the vehicle body in some cases. Furthermore, the fact that vehicles with less than four wheels are not allowed to run on the highway as stipulated by Chinese transport authorities is unlikely to be changed in a short term.

What are the advantages of the narrow body? Compared with the automobiles of normal width, the vehicle with a narrow body occupies a small space on the road, which helps the vehicle to pass through the traffic flow agilely, just like a rat. Thus, narrow body can offer obvious advantages when facing problems of a traffic jam, parking, cost, and unit price. Moreover, a study shows that an average height of automobile occupants ranges from 1.5 to 1.7 m, so a wide body is just a waste of cost and road resources, which increases the air pollution. At the present, when the whole world is concerning about the haze issue, building and maintaining roads and the land occupation are at a high cost, the electric components have growing maturity, and getting a licensable electric automobile which is allowed to run on the highway only costs thirty to forty thousand yuan (after being subsidized in compliance with Chinese measures in 2017), the present disclosure is particularly important and timely.

SUMMARY

The present disclosure aims to provide a self-stabilizing device for vehicles and a control method thereof. By using the mass gyroscope 4 with a vertical pivoting shaft, the vehicle is immune to all kinds of external forces and is unlikely to cause accidents such as vehicle tilting and toppling over as the vehicle is stabilized and more reliable during the course of movement. The present disclosure is particularly suitable for the vehicle with narrow body.

The present disclosure is realized by the following technical solutions. A self-stabilizing vehicle includes a vehicle occupant compartment 10, an occupant compartment chassis 11 (the vehicle occupant compartment and the occupant compartment chassis, as a whole, are referred to as 2), a plurality of wheels 13 symmetrically arranged on a left side and a right side of the vehicle, and other units and functions required for safe driving such as a drive unit, a steering unit, a braking unit, and various instruments etc., wherein the vehicle further includes a self-stabilizing device. A force for stabilizing the occupant compartment chassis is basically provided by a rigidly connected mass gyroscope 4 which maintains a vertical orientation of the vehicle. Additionally, multiple quick-response smart electromagnetic actuating systems are configured to provide advanced assistances and functions.

For a vehicle having three or more wheels, the load of the vehicle weight is basically evenly applied to any pair of the left and right wheels through a tangible or effective pivoting shaft 3 placed at a bottom of the vehicle compartment (without taking the load difference of the wheels on the left and right sides caused by a transverse external force such as a centrifugal force or crosswind into account).

The solutions 1-3 described below are based on the vehicle having more than three wheels.

Solution 1 (as shown in FIG. 1 and FIG. 4)

The pivoting shafts 13 of two wheels and shock absorbing units 15 thereof are provided at two ends of the transverse stabilizing lever 1, and the lever can rotate around the shaft 3 arranged below the center of the occupant compartment chassis 2 in a front-rear direction. Two ends of the lever move up and down like a seesaw according to the variation of the road condition, which makes the pressure of loads applied on the two wheels basically even in a static condition and straight line movement (unless the vehicle is subjected to a large transverse external force). The lever at the front side and the lever at the rear side can be connected to each other to form a drive platform 3. The centrally configured pivoting shaft is also unified to form a single longitudinal pivoting shaft. The height of a single longitudinal pivoting shaft should be as low as possible to reduce stress difference of the left wheel and the right wheel inevitably caused by the transverse forces such as the centrifugal force and the strong wind, etc.

The process of using the self-stabilizing vehicle with a mass gyroscope includes the following steps:
 a) when the vehicle is just started, if the mass gyroscope hasn't reached an effective rotation speed, instantly detecting, by a microprocessor, angle detectors 6 and 7 which include an electronic gyroscope located on the platform and the chassis and plumbing the chassis including the accelerating mass gyroscope to hold the chassis vertical by a force applied by a quick-response active push rod mechanism 5;
 b) when the vehicle is ready to start moving, keeping the vehicle to move at a speed not too fast to maintain the verticalness of the chassis and the mass gyroscope till the mass gyroscope reaches a preset rotation speed;
 c) turning off the push rod mechanism 5 to let the mass gyroscope to automatically stabilize the chassis under different conditions such as turning and running into the crosswind alone on the road surfaces of different slopes. Since the multiple wheels of the platform are in effective contact with different road surfaces and the platform can achieve a good moving function, the present disclosure is far more stable and safer than the two-wheeled vehicle which also uses the gravity gyroscope. However, if the vehicle makes a large turning angle or makes a quick turn, the occupants of the vehicle may possibly feel the centrifugal force.

If the vehicle is mainly stabilized by the electromagnetic system, the process of using the self-stabilizing vehicle with the mass gyroscope includes the following steps:
 a) without turning on the mass gyroscope, when the vehicle is just started, instantly detecting, by a microprocessor, the electronic gyroscopes located on the platform and the chassis; and plumbing the chassis by a force applied by the active push rod mechanism to hold the chassis vertical in perpendicular to the horizontal surface, then instantly starting the vehicle;
 b) after the vehicle is started, since the transverse slope of the road surface varies, and the centrifugal force may be generated as the vehicle makes a turn, or the vehicle may run into a strong crosswind and the occupant compartment chassis 2 may tilt to a side, the active push rod mechanism 5 may be pushed or pulled; in response to the pushing or pulling, instantly generating, by the quick-response push rod mechanism, an opposite force to offset the pushing or pulling force to zero, namely, all combined vector forces of the chassis and the load of the vehicle is directly transmitted to the pivoting shaft 3, providing the occupant with a perfect experience. This method is applicable to cases where there are not too many bumps on the road and the crosswind is not so strong, Otherwise, the push rod mechanism may not act timely and would make the vehicle occupants feel a strong sense of rocking or cause risks of toppling over.

Solution 2 (as shown in FIGS. 2, 3, 5 where a steering system is not shown)

The shock absorbing units of the left and right axles are fixed on two sides of the occupant compartment chassis 2. An angle between the axles and the chassis is controlled by stabilizing air cylinders 8, and the left and right air cylinders 8 are connected to each other through a liquid pipe. In this way, the axles on the two sides can function as a seesaw. Namely, the two axles, one moving up and another moving down, act in opposite directions and share the weight evenly.

The shock absorbing air cylinder or a spring and the stabilizing air cylinder can be integrally manufactured into a one-piece structure for saving the cost.

Solution 3 (as shown in FIG. 6)

Solution 3 is basically the same as solution 2 described above, but the stabilizing air cylinders on the two sides are not interconnected. The angle between the axles on the two sides and the chassis is controlled and adjusted by a smart system controlled by the microprocessor through the stabilizing air cylinders 8 to achieve the same result and function.

Solution 4 (as shown in FIG. 7)

If the vehicle is a two-wheeled vehicle, the drive platform and the chassis are combined as a whole to be stabilized by the mass gyroscope, while the vehicle occupant compartment, from centrifugal forces, and the chassis are around the effective pivoting shaft 12 as described above to make the occupants feel more comfortable. If a housing for shielding rain and wind is not needed, only the seat for the occupant and other portions related to driving the vehicle need to be centrifuged and tilted through the pivoting shaft 12 to achieve the same goal. Furthermore, the inclination degree of the vehicle occupant compartment may also be controlled by the smart actuators or by hands or feet of the driver.

Other details will be described in the specific embodiments hereinafter.

In the figures:
 1. stabilizing lever/drive chassis;
 2. a combination of the occupant compartment and the chassis fixed together;
 3. pivoting shaft for a rotation of the occupant compartment chassis relative to the stabilizing lever;
 4. mass gyroscope;
 5. push rod of an active push rod mechanism;
 6. electrical gyroscope fixed on the chassis;
 7. electrical gyroscope fixed on the stabilizing lever, drive platform or shock absorbing unit;
 8. stabilizing air cylinder;
 9. spring or cylinder of the shock absorbing unit;
 10. single occupant compartment;
 11. single chassis;
 12. effective bearing hinging the occupant compartment with the chassis;
 13. wheel and bearing thereof;
 14. pressure sensor;
 15. parallelogram shock absorbing unit of the vehicle; and 16. framing for hinging the occupant compartment with the chassis.

DETAILED DESCRIPTION OF THE EMBODIMENTS

The present disclosure will be further described hereinafter with reference to the drawings. When the vehicle needs to be parked for a while, a mechanical brake system may be used to keep the chassis and platform system still, and the electric system is turned off for saving electricity till the vehicle is started next time.

I. Solution 1 (the Idea Described in the Summary Above Continues in Further Details Below)

Figure 1:
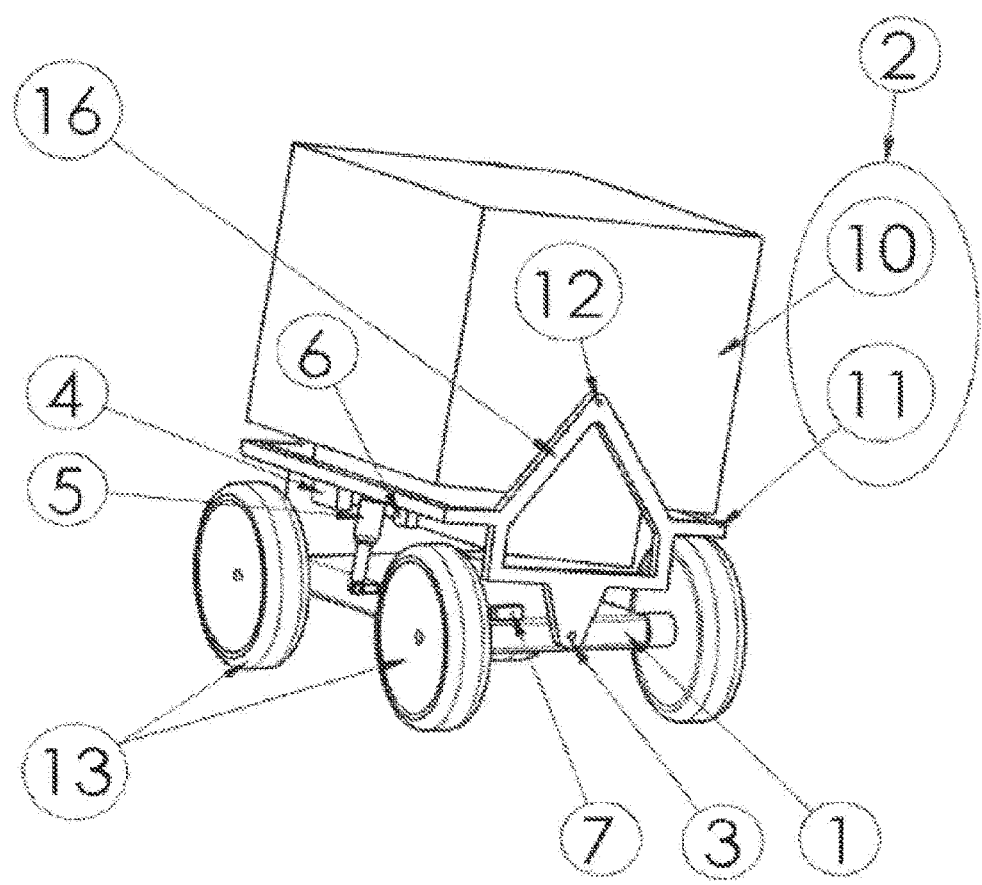
FIG. 1 is a schematic diagram showing a first state of a self-stabilizing vehicle (solution 1: a transverse lever acting like a seesaw)

As shown in FIG. 1, in a static condition of the vehicle, the self-stabilizing vehicle includes the drive platform 1 having multiple wheels. The vehicle having multiple wheels mainly refers to a three-wheeled vehicle or a four-wheeled vehicle. The three-wheeled vehicle may be a vehicle having two wheels at the front side and one wheel at the rear side, or a vehicle having one wheel at the front side and two wheels at the rear side. Specifically, the three-wheeled vehicle having two wheels at the front side is far more stable that the latter solution. In order to lower the center of gravity of the vehicle as much as possible, the platform 1 is preferably provided with a conventional power source, a steering system, a brake system, and the occupant compartment chassis 2 mounted with occupant seats and driver control panel, etc. The platform 1 is rotatably connected to the chassis 2 at the middle portion through the horizontal shaft 3 oriented in a front-rear direction. The front-rear direction refers to the direction of the vehicle moving in a straight line. The chassis is maintained at a vertical state which is relatively stable and safe through the stabilization of the mass gyroscope. The push rod mechanism 5 is provided between the platform and the chassis. A processor of the push rod mechanism collects data related to the electronic gyroscopes, stress condition of the wheels, drive speeds of the vehicle, or turning radius, etc., and operates on the data by given formulas to give the optimal instruction.

(1) A method for controlling a vehicle mainly relying on a mass gyroscope to achieve the self-stabilization is described as follows, which includes the following steps.

a) The vehicle is ready to be started at a relatively low speed, the intelligently controlled active push rod 5 is used to make the chassis 2 and the mass gyroscope 4 start acting and maintain the vertical state till the mass gyroscope reaches a preset rotation speed.

b) The active push rod system 5 is turned off to let the mass gyroscope automatically stabilize the occupant compartment chassis 2 in movement alone on the road surface with different slopes and under the action of external forces such as a wind force or a centrifugal force. But if the vehicle takes a large angle when turning or a quick turn, the occupants may feel the centrifugal force, or even the wheels may slip outward.

c) If the road surface has too many bumps, the speed should be limited. If the speed is too fast, the turning radius should be limited. If the wind is too strong, an alarm should be issued to ask the driver to open windows, or even the driver is not allowed to start the vehicle. The microprocessor is capable of providing all of these safety functions and services.

(2) A method for controlling a vehicle mainly relying on an electromagnetic push rod mechanism 5 to achieve the self-stabilization, which includes the following steps.

a) The mass gyroscope 4 is not turned on when the vehicle is about to be started, the microprocessor instantly detects the electronic gyroscopes 6 and 7 respectively fixed on the platform 1 and the chassis 2, and the chassis is plumbed by a force applied by the active push rod mechanism 5, then the vehicle can be started instantly.

b) After the vehicle is started, the transverse slope of the road surface varies, and the vehicle may be subjected to the centrifugal force as the vehicle makes a turn, or the chassis may tilt toward a side due to a strong crosswind, so that the active push rod device is pulled or pushed. The quick-response push rod system 5 instantly generates an opposite force to offset the pushing or pulling to nearly zero. Namely, the gravity of the chassis and the load acts on the pivoting shaft 3, thereby offering the occupants with a best experience. The method is applicable when the road surface doesn't have too many bumps and the crosswind is not too strong. Otherwise, the push rod mechanism may not act timely and make the occupants feel a strong sense of rocking.

(3) A method for controlling a stabilizing occupant compartment by using an electromagnetic system based on given formulas includes the following steps.

a) calculating the formulas to obtain parameters such as the tilt angle of the occupant chassis required to offset the centrifugal force at a given speed and turning radius, based on physical laws.

b) During the movement of the vehicle, the intelligently controlled push rod mechanism 5 can keep adjusting the tilt angle of the chassis to reach the tilt angle of the chassis 2 calculated according to the formulas.

c) if a strong breeze offers a certain degree of uniform wind force, the present method can also control the occupant compartment platform to tilt to a certain degree to offset the wind force. But if the crosswind blows and passes in a sudden manner, the driver should open the windows to minimize the effect of the crosswind. If the wind is too strong, the computer system should issue an alarm or ask the driver to stop the vehicle.

d) Likewise, the method is also applicable to the road surface with not too many bumps, so as to prevent the occupants from feeling a strong sense of rocking, or the vehicle from slipping.

Figure 2:
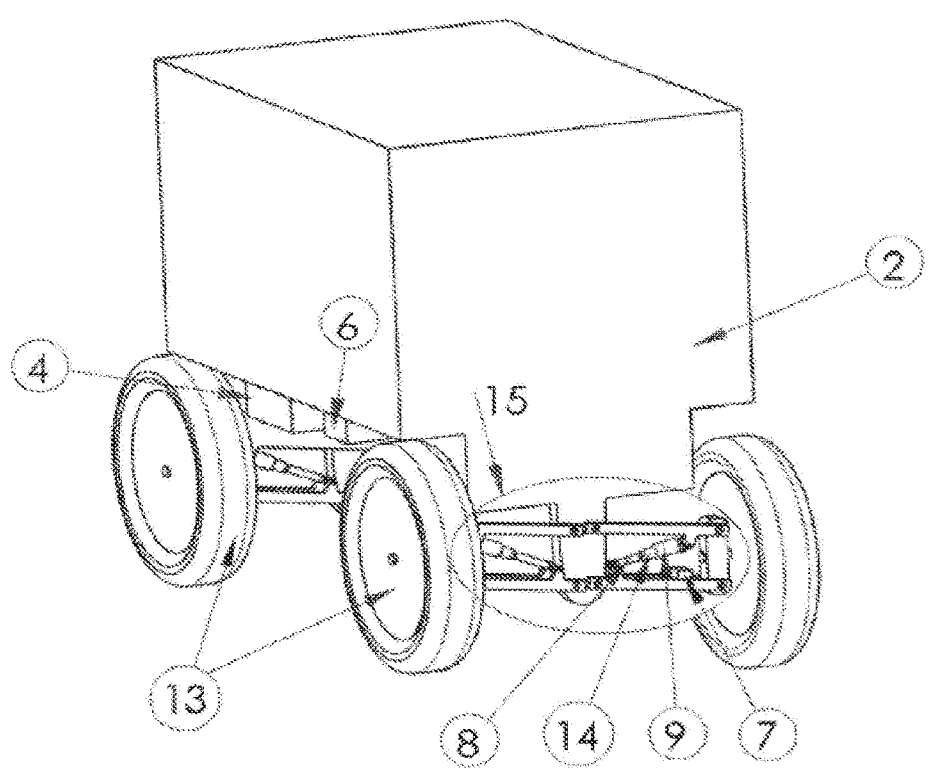
FIG. 2 is a schematic diagram showing a second state of the self-stabilizing vehicle.
Figure 3:
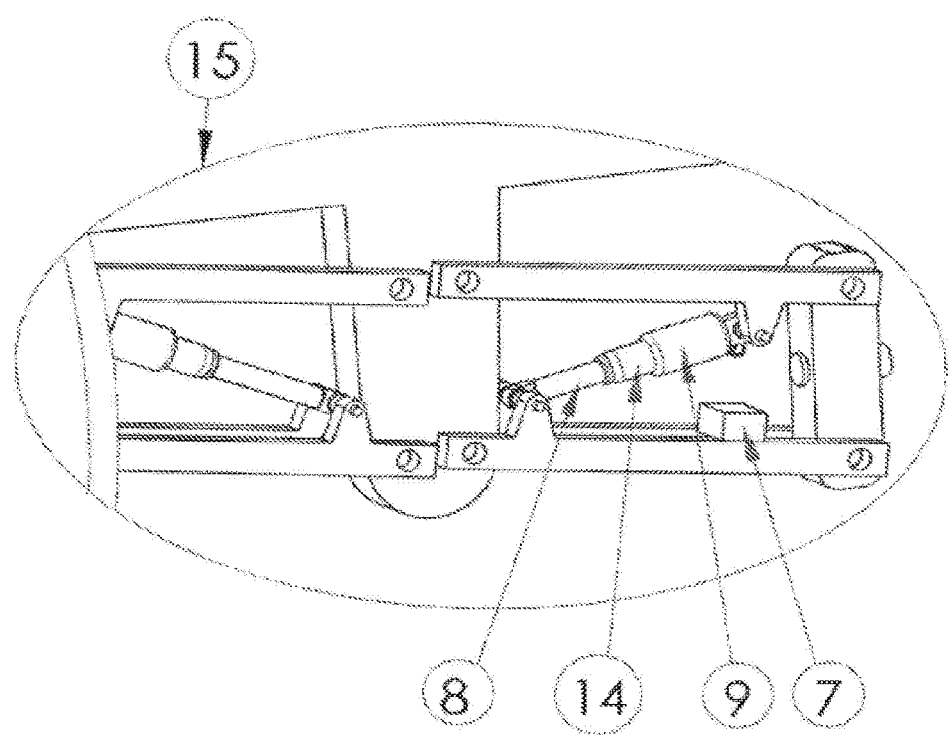
FIG. 3 is a partially enlarged view of FIG. 2.
Figure 4:
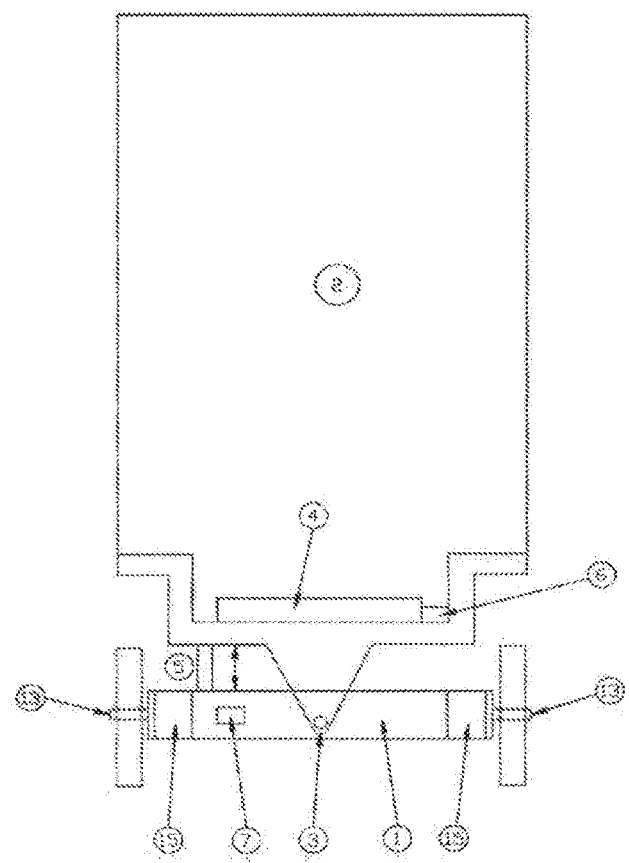
FIG. 4 is a modularized schematic diagram showing the connection of the components of the self-stabilizing vehicle.
Figure 5:
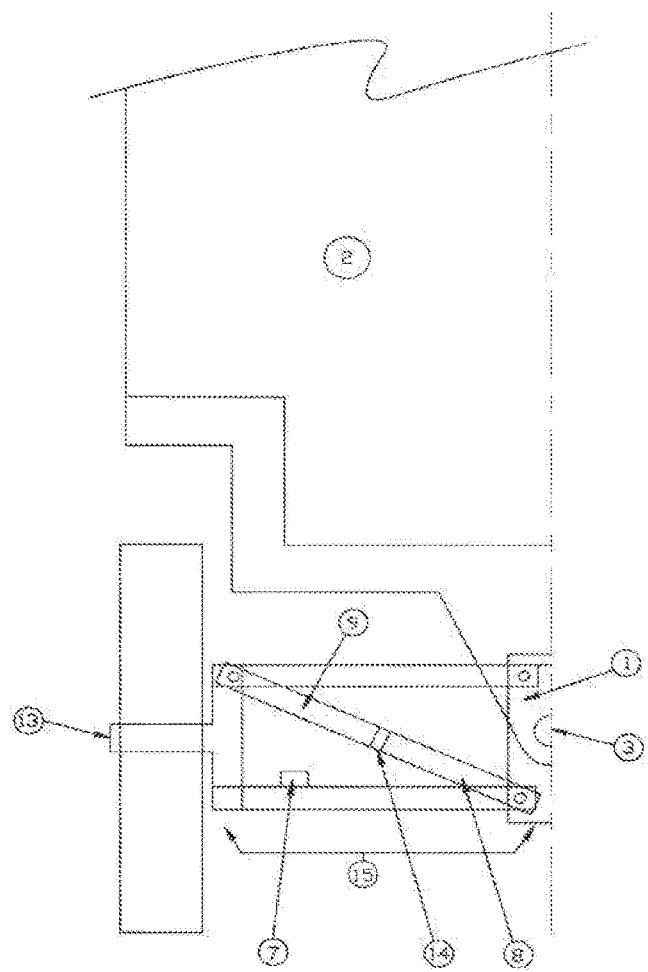
FIG. 5 is a schematic diagram showing that the stabilizing air cylinders of the two wheels are interconnected according to solution 2.

II. Solution 2 (as Shown in FIG. 2 and FIG. 3: The Stabilizing Air Cylinders of the Two Wheels are Interconnected)

b) The shock absorbing unit is the traditional parallelogram-like structure 15 having a spring or the shock absorbing air cylinder 9 which offers an elastic force. The shock absorbing air cylinders or springs on the left and right sides are connected to the stabilizing air cylinders 8. The stabilizing air cylinders on the left and right sides are connected to each other through a liquid transmission pipe. Since each of the components acts somewhat non-linearly, the united mechanism of the shock absorbing part and stabilizing part needs to be optimized by a mechanical non-linearity design and complementary means or adjusting a total amount of the liquid in the air cylinder by a microprocessor program to make the centrally mounted occupant compartment undergo a minimal up and down rocking and to keep stable.

c) The three methods or principles (1), (2), (3) described in solution 1 are all applicable here, which are not repeated again.

III. Solution 3 (the Stabilizing Air Cylinders of the Two Wheels are Controlled by a Microcontroller)

a) Solution 3 is similar to solution 2, the difference is that the stabilizing air cylinders on the two sides are not interconnected in solution 3. The angle between the axles on the two sides and the chassis is adjusted and controlled by the smart system of the microcontroller based on the data of the electronic gyroscopes, the speed of the vehicle, and the force applied to each axle, so as to achieve the same outcome and function. The data of the forces applied to the axles can be obtained from the pressure sensors mounted on the shock absorbing or the stabilizing mechanisms such as a strain gauge.

b) The three methods or principles (1), (2), (3) described in solution 1 are all applicable here, which are not repeated again.

Figure 6:
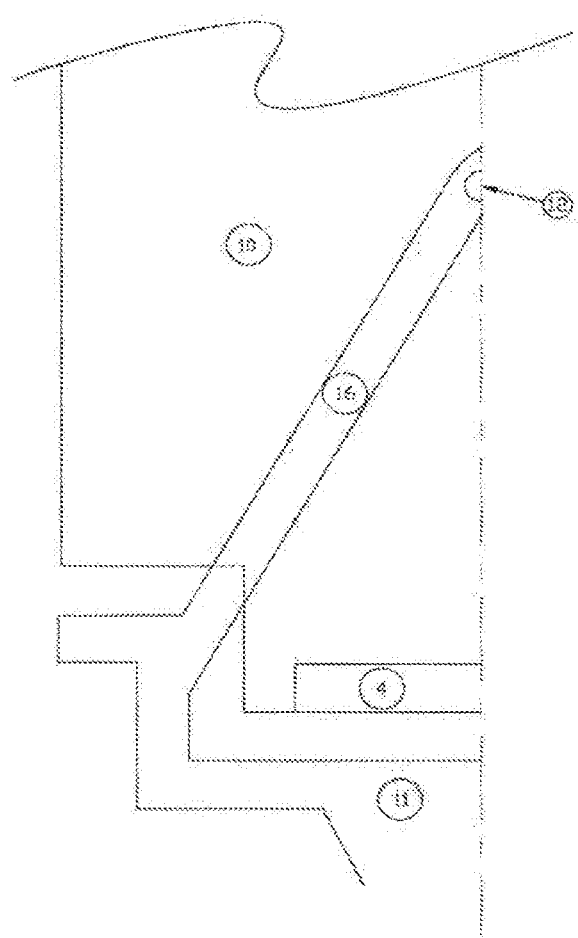
FIG. 6 is a schematic diagram showing that a microcontroller controls the two wheels according to solution 3.
Figure 7:
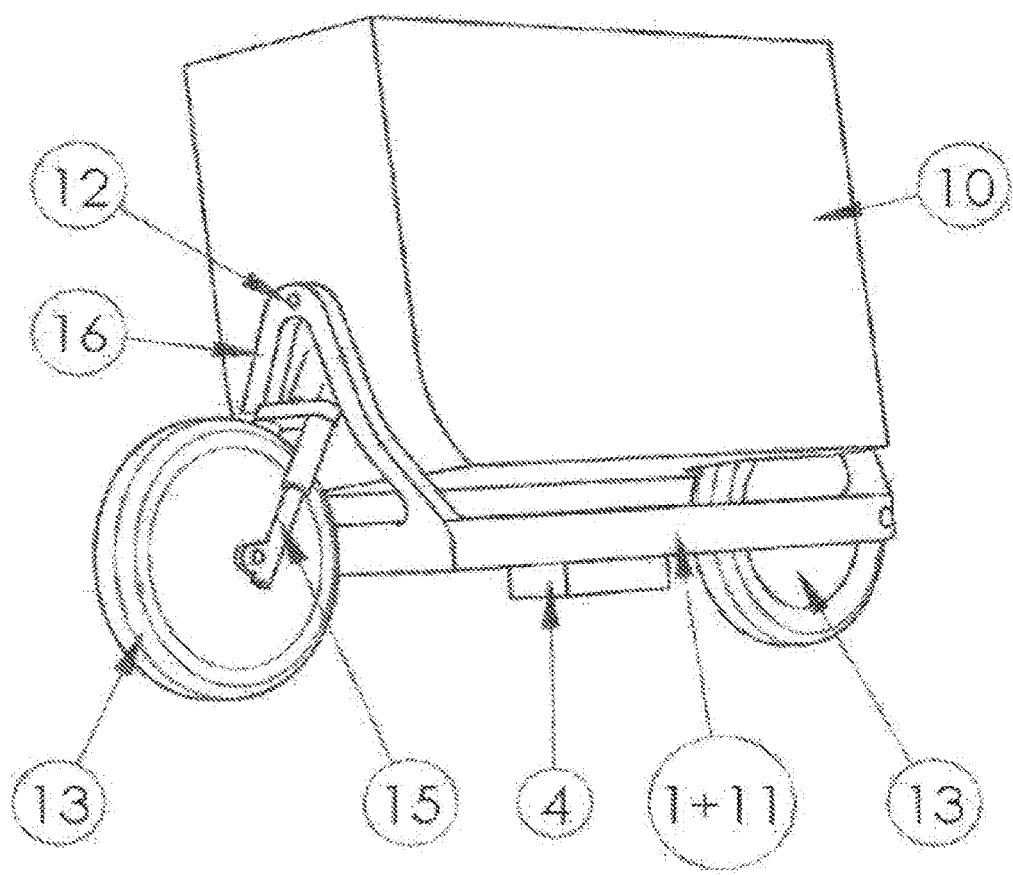
FIG. 7 is a schematic diagram showing a centrifuging and tilting function of an effective pivoting shaft according to solution 4.

IV Other Related Solutions (Shown in FIG. 7)

a) The occupant compartment 11 and the chassis 12 may be separated and hinged together through the two longitudinal and horizontal effective pivoting shafts 12 formed by bearings fixed at a pair of frames 16 at the front and rear sides of the platform to make a bottom of the occupant compartment and the seats in the interior slightly tilt outward under the action of the relative larger centrifugal force, so as to reduce the centrifugal force applied to the occupants and enhance the comfortable sensation.

b) If the vehicle is a two-wheeled vehicle, the drive platform and the chassis are combined as a whole to be stabilized by the mass gyroscope, while the vehicle occupant compartment, from centrifugal forces, and the chassis are around the effective pivoting shall 12 as described above to make the occupants feel more comfortable. If the product or the consumer chooses not to have a housing for shielding rain and wind, only the seat for the occupant and other portions related to driving the vehicle need to be centrifuged and tilted through the pivoting shaft 12 to achieve the same goal. Furthermore, the inclination degree of the vehicle occupant compartment may also be controlled by the smart actuators or by hands or feet of the driver. When the pivoting shaft 12 is locked, and the mass gyroscope 4 is turned off, one would feel like driving a normal two-wheeled motor vehicle (as shown in FIG. 6).

c) If the mass gyroscope is used, when the vehicle travels up or down a slope, a torsion will be generated to drive the chassis to rotate around the pivoting shaft 3 and tilt toward a side by an angle approximately equal to the angle of the slope, based on the physical laws. In an extreme case, the stability and safety of the vehicle may be affected. Therefore, a space for the pivoting shaft 3 to have a certain degree of ability to selectively rotate on a longitudinal plane of the vehicle may be designed to reduce the tilt angle of the occupant compartment chassis 2, so as to make the occupants feel more comfortable. At least one of a front bearing and a rear bearing of the pivoting shaft may be provided with the spring and a stopper to enable the pivoting shaft to achieve the expected functions. If the front bearing and the rear bearing both have elasticity in the up and down direction, then the front bearing and the rear bearing can make an independent shock absorbing unit.

d) The height of the occupant compartment and the response speed and the strength of the unified system of the stabilization and the shock absorption may be adjusted by the pressure of the air cylinder 8 of the shock absorbing unit 15 and the stabilizing unit to meet the requirements or preferences under different gravities or traveling conditions. Other methods are traditional and obvious and pertain to the prior are, so these methods are not repeated herein.

e) If the vehicle is a three-wheeled vehicle, wherein one wheel is arranged at the rear side, and the wheel set of two wheels is arranged at the front side. With this arrangement, the performances in turning and braking would be better and safer. The left and right wheels come in a pair are preferably identical in size and performance. The present disclosure is applicable for a vehicle having four or more wheels.

f) According to the above-mentioned technical solution and methods, if all of the electric and electronic systems (except for safety-related systems) are turned off, the driver who is able to drive a two-wheeled vehicle can also effectively control the vehicle through the centrifugal force by using skills of making a turn and tilting, so as to save electricity.

g) The center of gravity of the vehicle should be as low as possible. For instance, the components such as batteries, etc., should be mounted on the drive platform described in solution 1 as much as possible to reduce the stabilization requirements of the mass gyroscope.

h) In each of the above-mentioned embodiments, a security means including mechanical devices, electronic devices, warning lamps and sounds, and devices required by the program, and a means to limit or remedy some improper or self-harm operation, such as turning at a too small radius, driving at a too fast speed, or prematurely closing some functions, especially the stabilizing function, etc., should be provided to satisfy the national and industrial safety standards. Moreover, the microprocessor can offer many functions.

i) No matter if the gyroscope is the mass gyroscope or the electronic gyroscope, the techniques for stabilizing the vehicle by the mass gyroscope, the techniques for controlling the electromagnetic actuator, and the techniques related to the pressure sensor and the dynamic physics should be considered as a part of the prior art because there are many related reports on the internet and therefore are not repeated herein.

The above-mentioned embodiments are merely the preferred embodiments of the present invention, which are not intended to limit the scope of the present invention. Any modification, equivalent substitutions, or improvements derived based on the spirit and principle of the present disclosure should be considered as falling within the scope of the present disclosure.

What is claimed is:

1. A self-stabilizing vehicle, comprising an occupant compartment, a chassis of the occupant compartment, a drive unit and a brake unit, a stabilizing unit comprising a parallelogram structure and at least one pair of wheels,
wherein the chassis of the occupant compartment is fixedly provided with a mass gyroscope, the mass gyroscope has a stabilizing ability and is switchable; and the chassis of the occupant compartment is further fixedly provided with an electronic gyroscope;

wherein when the vehicle is in a static state or when the vehicle moves in a straight line, a load of a weight of the vehicle is evenly distributed on a left axle and a right axle of any pair of the wheels under any tilt angle of a road surface;

wherein the parallelogram structure is provided with a first cylinder mechanism disposed on a left side of the parallelogram structure and a second cylinder mechanism disposed on a right side of the parallelogram structure, wherein each of the cylinder mechanisms is connected to the parallelogram structure on opposing parallel sides forming a parallelogram of the parallelogram structure, wherein each of said cylinder mechanisms is composed of a respective stabilizing air cylinder that is mounted on or connected to a respective shock absorbing air cylinder or a respective spring, and each of the cylinder mechanisms further includes a respective detector to indirectly detect a stress situation of the left axle and the right axle.

2. The self-stabilizing vehicle according to claim 1, wherein the stabilizing air cylinders at the left side and the right side are interconnected through a liquid pipe to provide an effective stabilizing lever seesaw effect for the two wheels at the left side and the right side, and all of the stabilizing air cylinders are connected to an adjusting system to meet requirements of different gravities and different driving states, wherein the requirements include a height of the occupant compartment, and a response speed and a strength of a shock absorbing unit and the stabilizing unit.

3. The self-stabilizing vehicle according to claim 1, wherein the parallelogram structure comprises a left parallelogram and a right parallelogram, and each of the left parallelogram and the right parallelogram is provided with an electronic gyroscope; the stabilizing air cylinders comprise a left stabilizing air cylinder and a right stabilizing air cylinder, and at least one microcontroller is configured to control the left stabilizing air cylinder and the right stabilizing air cylinder.

4. The self-stabilizing vehicle according to claim 2, wherein an electric part of the stabilizing unit is optionally turned off during driving of the vehicle.

* * * * *